(12) United States Patent
Take et al.

(10) Patent No.: US 6,470,419 B2
(45) Date of Patent: *Oct. 22, 2002

(54) CACHE CONTROLLING APPARATUS FOR DYNAMICALLY MANAGING DATA BETWEEN CACHE MODULES AND METHOD THEREOF

(75) Inventors: Riichiro Take; Kazutaka Ogihara; Yasuo Noguchi; Kenji Nagahashi, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,252

(22) Filed: Jun. 22, 1999

(65) Prior Publication Data
US 2002/0108020 A1 Aug. 8, 2002

(30) Foreign Application Priority Data
Dec. 17, 1998 (JP) ............................................. 10-358625

(51) Int. Cl.⁷ .............................................. G06F 12/02
(52) U.S. Cl. ........................ 711/113; 711/120; 711/124; 711/133
(58) Field of Search .................................. 711/122, 140, 711/144, 124, 137, 146, 118, 119, 133, 160, 134, 136, 113, 120

(56) References Cited

U.S. PATENT DOCUMENTS

| | | | | |
|---|---|---|---|---|
| 5,392,445 A | * | 2/1995 | Takamoto et al. | 711/113 |
| 5,437,022 A | * | 7/1995 | Beardsley et al. | 711/120 |
| 5,504,882 A | * | 4/1996 | Chai et al. | 711/100 |
| 5,655,100 A | * | 8/1997 | Ebrahim et al. | 711/144 |
| 5,692,152 A | * | 11/1997 | Cohen et al. | 711/140 |
| 5,909,697 A | * | 6/1999 | Hayes et al. | 711/144 |
| 6,049,850 A | * | 4/2000 | Vishlitzky et al. | 711/113 |
| 6,073,212 A | * | 6/2000 | Hayes et al. | 711/122 |
| 6,141,731 A | * | 10/2000 | Beardsley et al. | 711/136 |
| 6,327,644 B1 | * | 12/2001 | Beardsley et al. | 711/136 |

* cited by examiner

Primary Examiner—Matthew Kim
Assistant Examiner—Brian R. Peugh
(74) Attorney, Agent, or Firm—Staas & Halsey LLP

(57) ABSTRACT

A memory area for storing the data for management of a page and a memory area for storing the data of the page itself are allowed to be distributed and allocated to separate caches. An access request for a storage module is received by a cache module managing the access request, and if a requested page is stored in another cache module, a responding process for the access request is performed jointly with the other cache module.

13 Claims, 11 Drawing Sheets

CACHE CONTROLLING APPARATUS FOR DYNAMICALLY MANAGING DATA BETWEEN CACHE MODULES AND METHOD THEREOF

BACKGROUND OF THE INVENTION

1. Field of the Invention

The present invention relates to a cache controlling apparatus for controlling the use of the memory of a cache module in a storage system which is composed of a plurality of cache modules connected to a network and a plurality of storage modules connected to the cache modules, and a method thereof.

2. Description of the Related Art

In recent computer systems, a buffer storage device using semiconductor memories is often provided between an auxiliary storage device and a requester of information in order to increase access speed to information in the auxiliary storage device. A buffer storage device for a disk device is called a disk cache, and is often provided in a disk controller for controlling the disk device.

Here, a storage system which is composed of a plurality of storage modules corresponding to the disk devices and a plurality of cache modules corresponding to buffer storage devices connected to the storage modules is assumed to be used.

It is assumed that a disk page managed by each cache module is stored in a storage module connected to the cache module. Here, a disk page corresponds to information stored in a memory area (block) of a predetermined fixed length, and "to manage the disk page" means to receive an access request for the disk page and to perform both exclusive control and consistency maintaining control, etc., over the disk page.

For example, a case where a storage system is provided with two cache modules A and B, where many access requests center on a storage module managed by the cache module A and where an access request for a storage module managed by the cache module B is rather rare, is studied.

In this case, it is desirable for the cache module A to have a greater memory capacity than the cache module B. A greater memory capacity results in a better cache hit rate, and a poorer hit rate of a cache module which rarely receives an access request is compensated for by the better hit rate of a cache module which frequently receives an access request. However, in practice, the memory capacity of each cache module is fixed in advance depending on the hardware, and cannot be modified according to the frequency of access requests.

This will become more clear if this method is compared with the LRU (least recently used) method which is a standard method for determining pages stored in a cache. As its name indicates, the LRU method leaves the recently used pages in a cache, and selects the least recently used page for replacement. Therefore, a group of selected pages are arranged in a cache in descending order of the most recent access time until the cache is filled up with pages. Here, the most recent access time indicates the access time at which access has most recently been gained, of all prior instances of access to the page.

Generally speaking, it is observed that the more recent the most recent access time of a certain page is, the higher the probability of an access request for the page is. Therefore, the LRU method exercises optimum control over replacing a page with the least possibility of being accessed.

However, when there is a difference in the frequency of requests in an access between two cache modules, as shown in the above example, and if control using the LRU method is independently exercised within the scope of the given memory capacity of each cache module, the LRU method cannot be realized for the entire system, and optimum control cannot be exercised.

In this case, the range of the most recent access times of a group of pages in a cache module with a high frequency of access requests becomes narrower than that in a cache module with a low frequency of access requests. The range of the most recent access times is a time difference between the newest time and the oldest time of the most recent access times of the pages in a cache module.

In this way, the fact that there is a difference in the range of the most recent access times between cache modules indicates that in a cache module with a high frequency of access requests, the replacement of a page which should not be made from the viewpoint of the entire system easily occurs, and that in a cache module with a low frequency of access requests, the replacement of a page which should be made from the viewpoint of the entire system rarely occurs. Therefore, optimum control is not exercised for the entire system.

SUMMARY OF THE INVENTION

An object of the present invention is to provide a cache controlling apparatus and method for performing optimum page allocation for the entire system in a storage system which is composed of a plurality of storage modules and a plurality of cache modules.

In the first aspect of the present invention, the cache controlling apparatus comprises a management unit, a transfer-out unit and a transfer-in unit, and controls the cache operation of a storage system which is composed of a plurality of cache modules connected to each other and a plurality of storage modules each connected to each cache module and storing information.

The management unit allows information managed by a first cache module of the plurality of the cache modules to be stored in a second cache module. The transfer-out unit transfers out the information managed by the first cache module from the first cache module to the second module. The transfer-in unit transfers in the information managed by the first cache module from the second cache module to the first cache module.

In the second aspect of the present invention, the cache controlling apparatus comprises a shift unit and a receiver unit. The shift unit dynamically shifts information managed by a first cache module between the first cache module and a second cache module. The receiver unit receives access requests for the information shifted to the second cache module via the first cache module.

In the third aspect of the present invention, the cache controlling apparatus comprises a management unit, a transfer-out unit, a transfer-in unit, a judgement unit and a transfer-out destination determining unit, and controls the cache operation of a storage system which is composed of a plurality of cache modules connected to each other and a plurality of storage modules each connected to each cache module and storing information.

The management unit allows information managed by a first cache module of the plurality of the cache modules to be stored in a memory of a second cache module. The transfer-out unit transfers out the information managed by the first cache module and is stored in a memory of the first cache module from the memory of the first cache module to the memory of the second cache module.

The transfer-in unit transfers in information managed by the first cache module and stored in the memory of the second cache module from the memory of the second cache module to the memory of the first cache module. The judgment unit judges whether arbitrary information in the memory of the first cache module should continue to be left in the first cache module, be discarded or be transferred out. The transfer-out destination determining unit determines to which cache module the arbitrary information is transferred out if the arbitrary information should be transferred out.

DESCRIPTION OF THE PREFERRED EMBODIMENTS

The preferred embodiments of the present invention are described in detail below with reference to the drawings.

Figure 1:
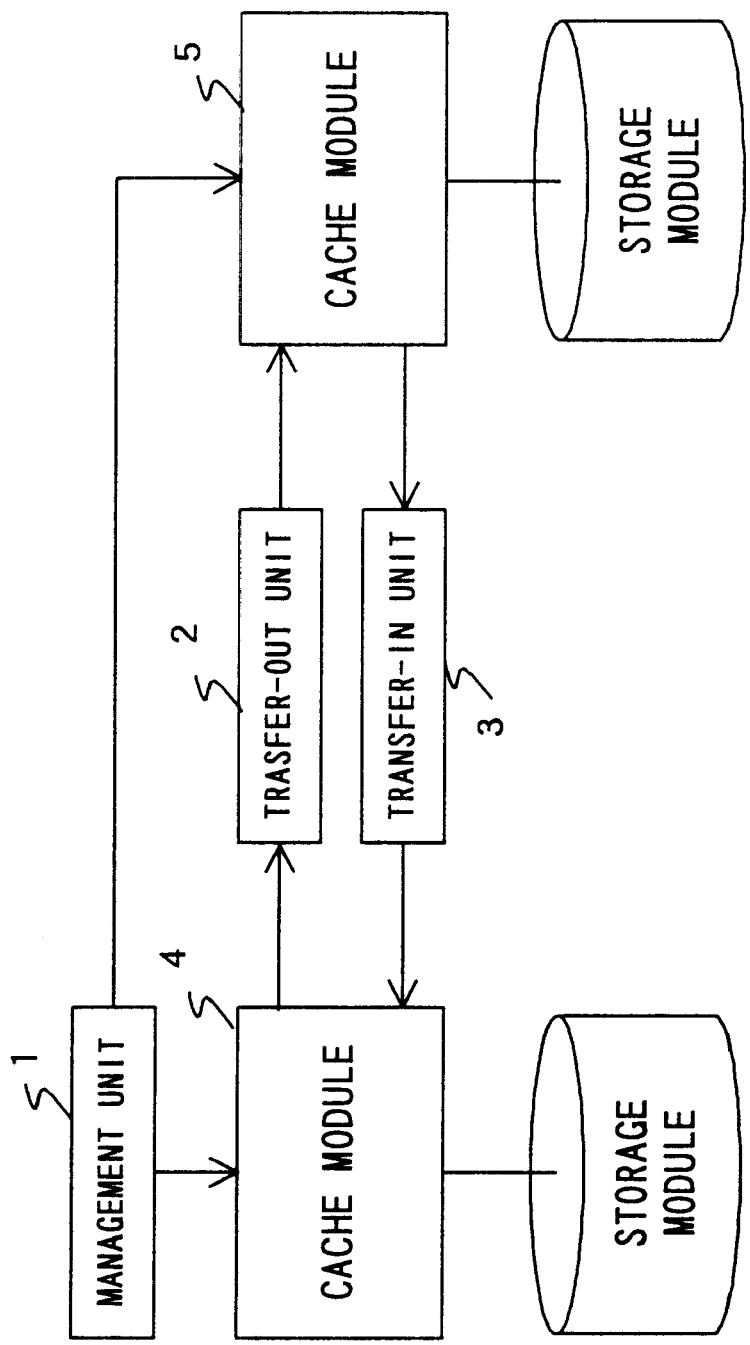
FIG. 1 shows the principle of a cache controlling apparatus of the present invention.

FIG. 1 shows the principle of a cache controlling apparatus of the present invention. The cache controlling apparatus shown in FIG. 1 comprises a management unit 1, a transfer-out unit 2 and a transfer-in unit 3, and controls the cache operation of a storage system which is composed of a plurality of cache modules connected to each other and a plurality of storage modules each connected to each cache module and storing information.

The management unit 1 allows information managed by a cache module 4 out of the plurality of the cache modules to be stored in another cache module 5.

The transfer-out unit 2 transfers out the information managed by the cache module 4 from the cache module 4 to the cache module 5.

The transfer-in unit 3 transfers in the information managed by the cache module 4 from the cache module 5 to the cache module 4.

The management unit 1, for example, uniformly manages information, such as a page which is read from a storage module managed by the cache module 4, etc., and even if a part of the information is stored in the cache module 5, the management unit 1 knows its location. The transfer-out unit 2 shifts the information managed by the cache module 4 and stored in the cache module 4, to the cache module 5, if necessary. The transfer-in unit 3 transfers the information managed by the cache module 4 and stored in the cache module 5, into the cache module 4, if necessary.

In this way, by providing the management unit 1 for uniformly managing information corresponding to each cache module and the transfer-out unit 2 and transfer-in unit 3 for dynamically shifting managed information between two cache modules, information managed by one cache module can be distributed to and stored in a plurality of cache modules.

For example, if a new access request is received in a state where there is no empty area in the memory of the cache module 4 and it is necessary to secure an empty area, the empty area can be secured by the transfer-out unit 2 transferring out the information to the cache module 5 without discarding any information stored in the cache module 4. Then, requested information can be read into the secured area from a storage module. If the requested information is stored in the cache module 5, the information can be transferred into the secured area of the cache module 4 by the transfer-in unit 3.

If all the memories of cache modules in a system are full, for example, a cache module which stores information having the least recent access time in the system discards the information. Then, the overflowing information can be transferred out from a cache module which receives an access request to the cache module.

In this way, when a new access request is received, by providing a mechanism such that each cache module can perform distributed processing jointly with another cache module and the information of the other cache module can be discarded, the optimum information allocation for the entire system can be performed.

For example, the management unit 1, transfer-out unit 2 and transfer-in unit 3 shown in FIG. 1 correspond to a page management unit 11, transfer-out unit 14 and transfer-in unit 15, respectively, shown in FIG. 2, and described later.

In order to realize optimum page allocation for the entire system in a storage system including a plurality of cache modules, it is necessary for each cache module not to independently execute a process, but to perform distributed processing jointly with another cache module.

In a storage system, it is also necessary to exercise exclusive control over all memory areas or a part of one storage module. In this case, if each cache module manages a different page, exclusive control over a set of pages would become an extensive process which requires communications between cache modules. Therefore, it is desirable for one cache module to manage a group of pages belonging to one storage module.

Consistency maintaining control requires a write back process from a cache module to a storage module. In this case, if each cache module manages a different page, a write-back process for the set of pages also becomes an extensive process which requires communications between cache modules. In order to efficiently execute this write-back process by collectively writing, it is also desirable for one cache module to manage a group of pages belonging to one storage module.

For this reason, in the present invention, a memory area where data for management of a page are stored and a memory area where data of the page itself are stored can be assigned to different cache modules. Thus, although one cache module manages a set of pages belonging to one storage module, the set of pages belonging to the storage module are distributed to a plurality of cache modules.

In this case, an access request for a storage module is received by a cache module managing the storage module, and the cache module checks the location of a requested page. If the page is stored in another cache module, the cache module executes a responding process for the access request jointly with the other cache module.

According to such a system, a group of pages of one storage module can be distributed to a plurality of cache modules, a page of a storage module with a high frequency of access requests can be shifted from a cache module managing the page to another cache module managing a storage module with a low frequency of access requests.

For this reason, access requests cannot center on one cache module, and the range of the most recent access times of the cache module cannot be narrowed. Therefore, optimum page allocation for the entire system can be performed, and the hit rate of caches is improved.

However, if a requested page is stored in another cache module, a joint operation between a cache module managing the page and a cache module storing the page occurs. As a result, in this case, the response time becomes longer according to the amount of overhead required by the joint operation.

If a page is stored in the cache, the response time is usually less than 1 ms, and thus is very short. Therefore, the influence on response time of the overhead of the joint operation may increase. Accordingly, overhead against response time is must be reduced as much as possible.

Accordingly, a strategy such that a page with a high possibility of receiving access requests, of pages managed by a certain cache module is stored in the memory of the cache module and a page with a rather low possibility of receiving access requests compared with the page with the high possibility of receiving access requests is allocated to another cache module, is employed.

By employing this strategy, the possibility that a page which is stored in a cache and is to be accessed, may be stored in a cache module other than the cache module managing the page can be reduced, and the overhead slowing response time in the case where the page is stored in the cache, can be reduced.

In order to employ this strategy, a function to dynamically shift pages between cache modules must be provided. This is because the possibility that a certain page is accessed varies every moment. According to a certain observation based on the LRU method, the possibility that a page stored in a cache may receive an access request is gradually reduced as time elapses while there is no access to the page, and the moment there is access to the page, the possibility greatly increases.

In this way, if the possibility of receiving an access request varies, a cache module which should store the page also varies. Thus, while a page has a great possibility of receiving an access request, the page is stored in the cache module managing the page, and if the possibility reduces, the page is shifted to another cache module or is simply discarded. If the possibility that a page stored in a cache module other than the cache module managing the page may receive an access request increases because the page has received an access request, the page is shifted into the cache module managing the page.

Figure 2:
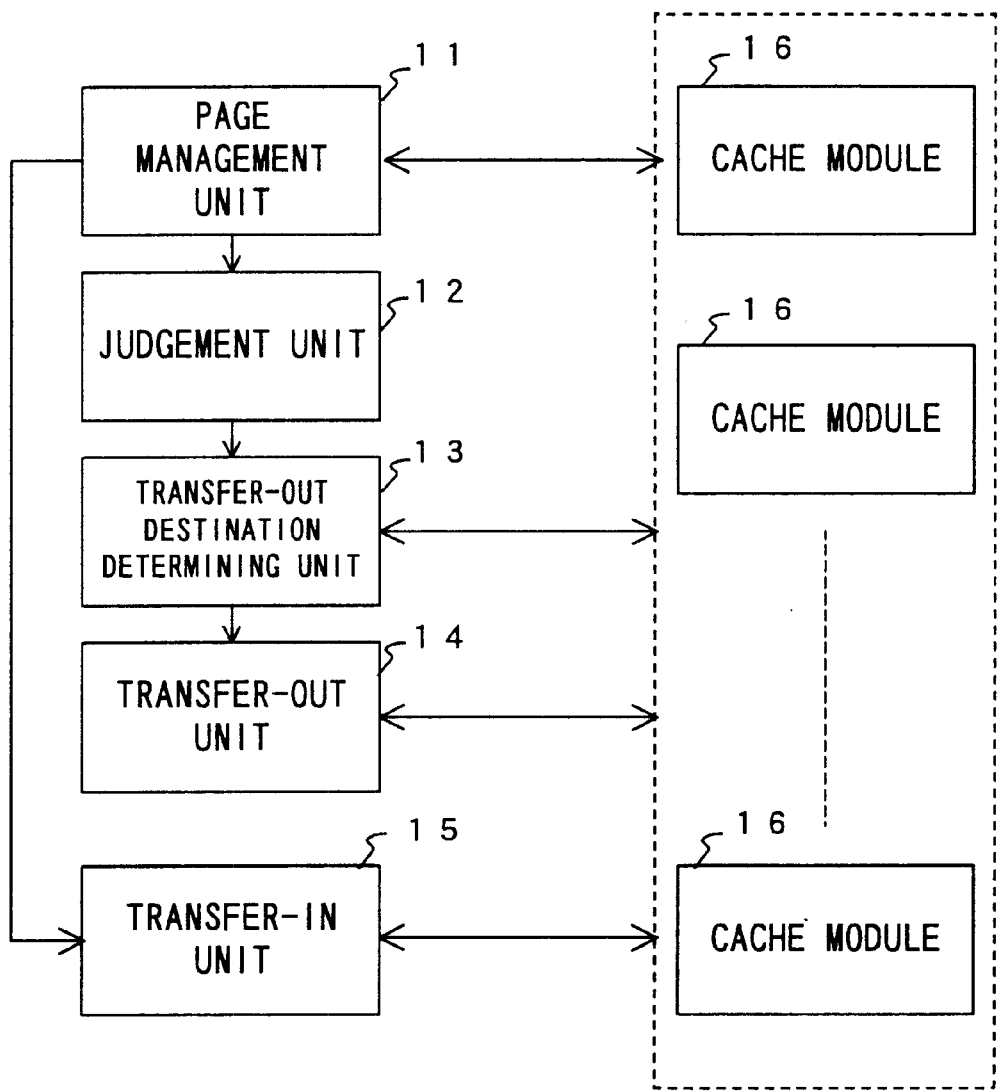
FIG. 2 shows the configuration of the cache controlling apparatus.

FIG. 2 shows the configuration of the cache controlling apparatus which performs such an operation. The cache controlling apparatus shown in FIG. 2 comprises a page management unit 11, a judgement unit 12, a transfer-out destination determining unit 13, a transfer-out unit 14 and a transfer-in unit 15.

The page management unit 11 performs page management so as to allow a group of pages managed by a certain cache module 16 to be stored in another cache module 16. The transfer-out unit 14 transfers out a page managed by the specific cache module 16 and stored in the memory of the cache module 16, to the memory of another cache module 16. The transfer-in unit 15 transfers in a page managed by the specific cache module 16 and stored in the memory of another cache module 16 to the memory of the cache module managing the page.

The judgment unit 12 judges whether each page managed by the page management unit 11 should be left in the memory, discarded or transferred out. The transfer-out destination determining unit 13 determines the destination to which the page judged to be transferred out by the judgment unit 12 is transferred.

For example, each cache module 16 is provided with the cache controlling apparatus shown in FIG. 2, and when receiving an access request for a page stored in a storage module, the cache controlling apparatus obtains the location of a requested page by using the page management unit 11. Then, if the page is stored in the memory of the cache module 16, the cache controlling apparatus processes the access request for the page, updates the most recent access time of the page, and terminates the operation. The most recent access time is managed by the page management unit 11.

If the requested page is not stored in the cache or is stored in another cache module 16, the cache controlling apparatus secures an area to store the page in the memory of the cache module 16 itself which has received the access request. Then, the cache controlling apparatus reads the target page into the area from a storage module or transfers the target page from the other cache module 16 into the area Here, in order to secure this area while the memory is full, it is necessary to discard or transfer out any page stored in the memory. Under these circumstances, the cache controlling apparatus checks whether there is any transferrable page in the memory using the judgment unit 12. If the oldest page in the memory is significantly newer than the oldest page in all the memories of other cache modules, the judgment unit 12 judges that the page is transferrable.

If there is a transferrable page, the cache controlling apparatus transfers out the page to a cache module 16 determined by the transfer-out destination determining unit 13 using the transfer-out unit 14 to secure the area for the target page. If there is no transferrable page, the cache controlling apparatus discards a page determined by the judgment unit 12 to secure the area for the target page.

The judgment unit 12, for example, compares the most recent access times of pages stored in the memory of the cache module 16, and obtains the oldest time of the most recent access times (the oldest most recent access time) of the cache module 16.

Then, the lower-limit of the time is calculated from the oldest most recent access time using a transfer-out lower-limit function. If the most recent access time is newer than the lower-limit, it is judged that the page should be transferred out, and if the most recent access time is equal to or older than the lower-limit, it is judged that the page should be discarded. If the memory is not full, it is judged that all pages should be left in the memory.

For the transfer-out lower-limit function, for example, an average of the most recent access times in all cache modules 16 can be used. It is assumed here that the total number of cache modules is n and the oldest most recent access time of a group of pages stored in cache modules #i (i=0,1, ... , n−1) is ri. In this case, assuming that $\epsilon$ is a small positive constant, the transfer-out lower-limit function is expressed using the following equation.

$$\frac{\sum_{i=0}^{n-1}}{n} + \varepsilon \quad (1)$$

Provided, however, that the judgment unit 12 holds the oldest most recent access time ri of cache modules #i through communications between cache modules.

The transfer-out destination determining unit 13 selects a cache module having ri equal to or older than the lower-limit calculated using the transfer-out lower-limit function or a cache module having the oldest ri as a transfer-out destination.

Figure 3:
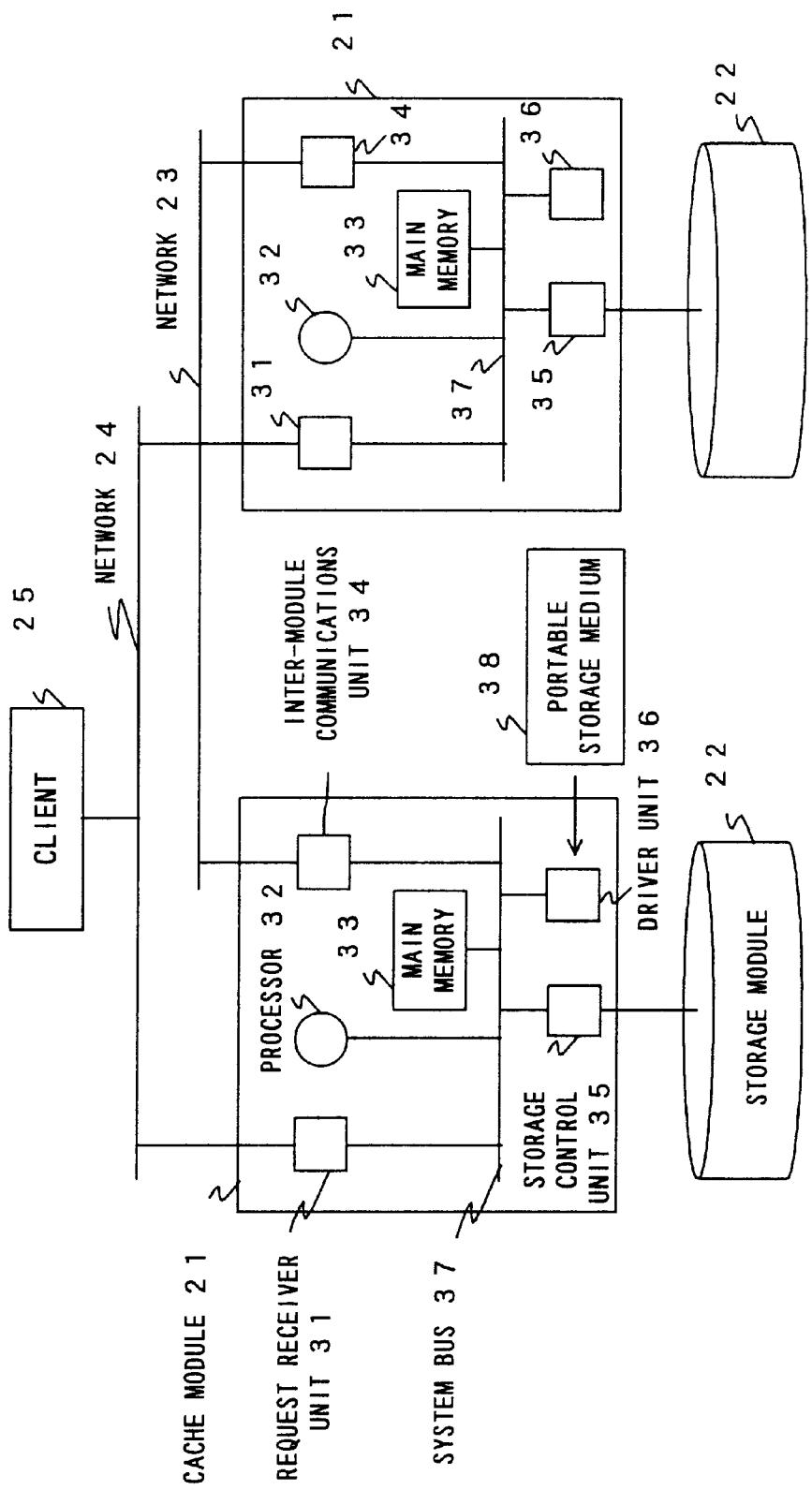
FIG. 3 shows the configuration of a storage system.

FIG. 3 shows the configuration of a storage system including a cache module on which such a cache controlling apparatus is mounted. The storage system shown in FIG. 3 comprises a plurality of cache modules 21, a plurality of storage modules 22 and a communications network 23 connecting the cache modules 21, and the storage system is connected to a client 25 via a communications network 24.

The storage module 22 corresponds to a secondary storage device, such as a magnetic disk device, optical disk device, magneto-optical disk device, etc., and the client 25 corresponds to a computer system, etc., requesting data stored in the storage module 22. The cache module 21 reads requested data from a main memory 33 or the storage module 22 according to an access request received from the client 25, and transmits the data to the client 25.

Each cache module 21 includes a request receiver unit 31, a processor 32, a main memory 33, an inter-module communications unit 34, a storage control unit 35 and a driver unit 36, which are connected to each other via a system bus 37.

The request receiver unit 31 is a network interface which is connected to a network 24 and controls communications with the client 25. The request receiver unit 31 receives access requests from the client 25. The processor 32 processes data stored in the main memory 33 by executing a program.

The page management unit 11, judgment unit 12 and transfer-out destination determining unit 13 shown in FIG. 2 correspond to software components stored in specific program code segments of the main memory 33, and execute necessary processes using data in the main memory 33.

The inter-module communications unit 34 is a network interface which is connected to a network 23 and controls communications with other cache modules 21. Both the transfer-out unit 14 and transfer-in unit 15 shown in FIG. 2 correspond to this inter-module communications unit 34.

The storage control unit 35 is a storage interface which controls access to the storage module 22, and inputs and outputs data between the main memory 33 and the storage module 22. The driver unit 36 drives a portable storage medium 38, and gains access to the recorded contents. For the portable storage medium 38, an arbitrary computer-readable storage medium, such as a memory card, floppy disk, compact disk read-only memory (CD-ROM), optical disk, magneto-optical disk, etc., can be used.

The system can also be configured in such a way that a program and data used for the process are stored in this portable storage medium 38, and the process is executed by loading the program and data to the main memory 33. Alternatively, the cache module 21 can receive the program and data from an external device in the network 24, and the process can be executed by loading them to the main memory 33.

Next, the change in data stored in the cache module 21 is described in detail with reference to FIGS. 4 through 11. It is assumed in the following preferred embodiments that the storage module 22 is used as a disk device and stored data are managed for each disk page.

Figure 4:
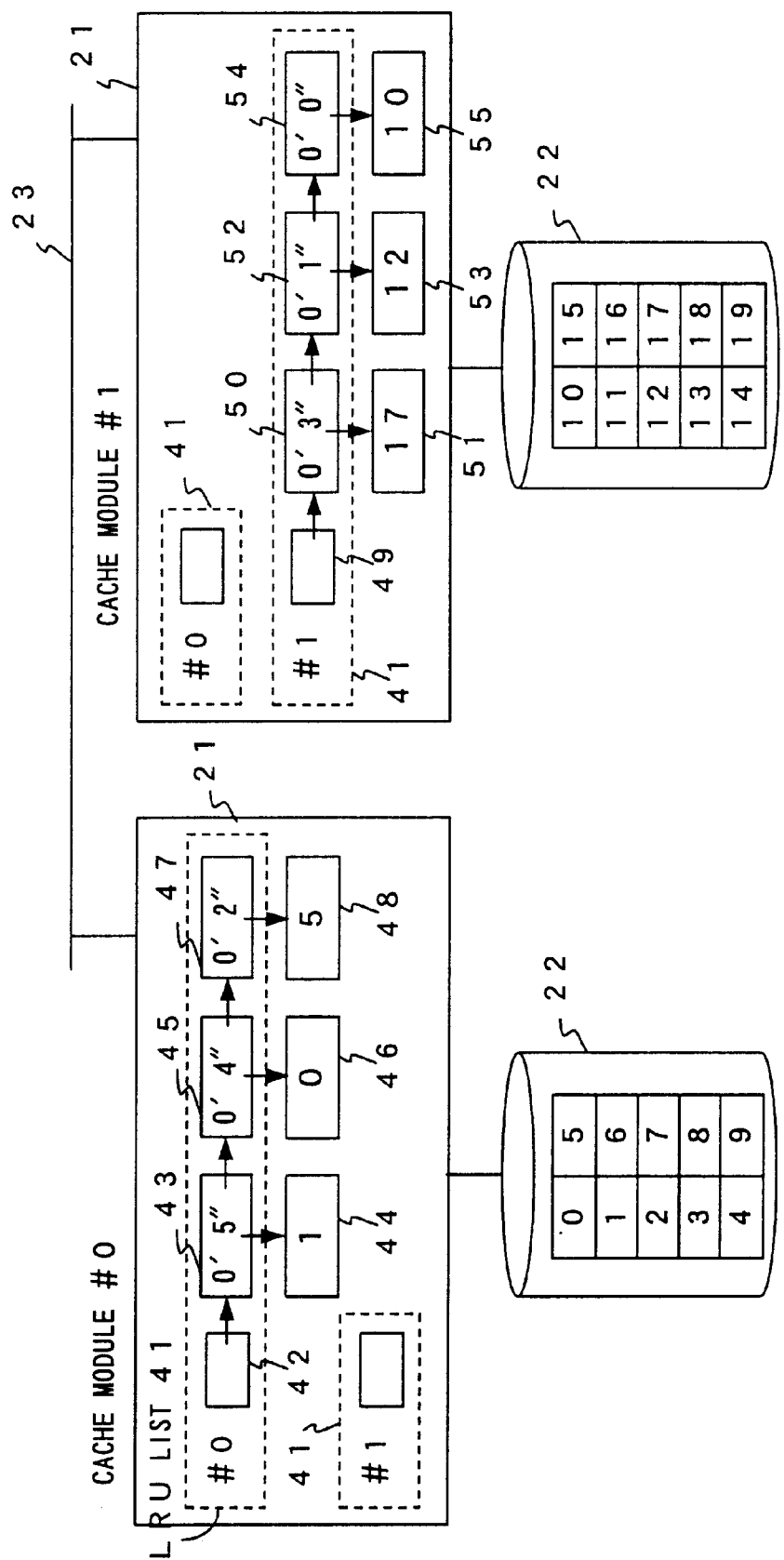
FIG. 4 shows the first state.

FIG. 4 shows the state at time 0'5" (0 minute 5 seconds) of the main memory 33 of each cache module in a storage system which is composed of two cache modules #0 and #1.

Pages "0" through "9" are stored in a storage module 22 managed by the cache module #0, and the cache module #0 receives access requests for these pages. Pages "10" through "19" are stored in a storage module 22 managed by the cache module #1, and the cache module #1 receives access requests for these pages. Here, in order to simplify the description, it is assumed that all requests are read requests.

Each main memory 33 of the cache modules #0 and #1 has a memory capacity for storing three pages, and has one LRU list 41 corresponding to each of the two cache modules #0 and #1. Each element of the LRU list 41 is a structure for managing one of the pages stored in the main memory 33, and has a pointer to a page managed by each element, the most recent access time of the page and a pointer to the next element.

For example, in the LRU list #0 stored in the cache module #0, a first element 42 has a pointer to a second element 43, and the second element 43 has a pointer to the data 44 of page "1", the most recent access time "0'5"" of page "1" and a pointer to a third element 45.

The third element 45 has a pointer to the data 46 of page "0", the most recent access time "0'4"" of page "0" and a pointer to a fourth element 47. The fourth element 47 has a pointer to the data 48 of page "5" and the most recent access time "0'2"" of page "5". Since the fourth element 47 is the last element, it does not have a pointer to the next element.

In the LRU list #1 stored in the cache module #1, a first element 49 has a pointer to a second element 50, and the second element 50 has a pointer to the data 51 of page "17", the most recent access time "0'3"" and a pointer to a third element 52.

Figure 5:
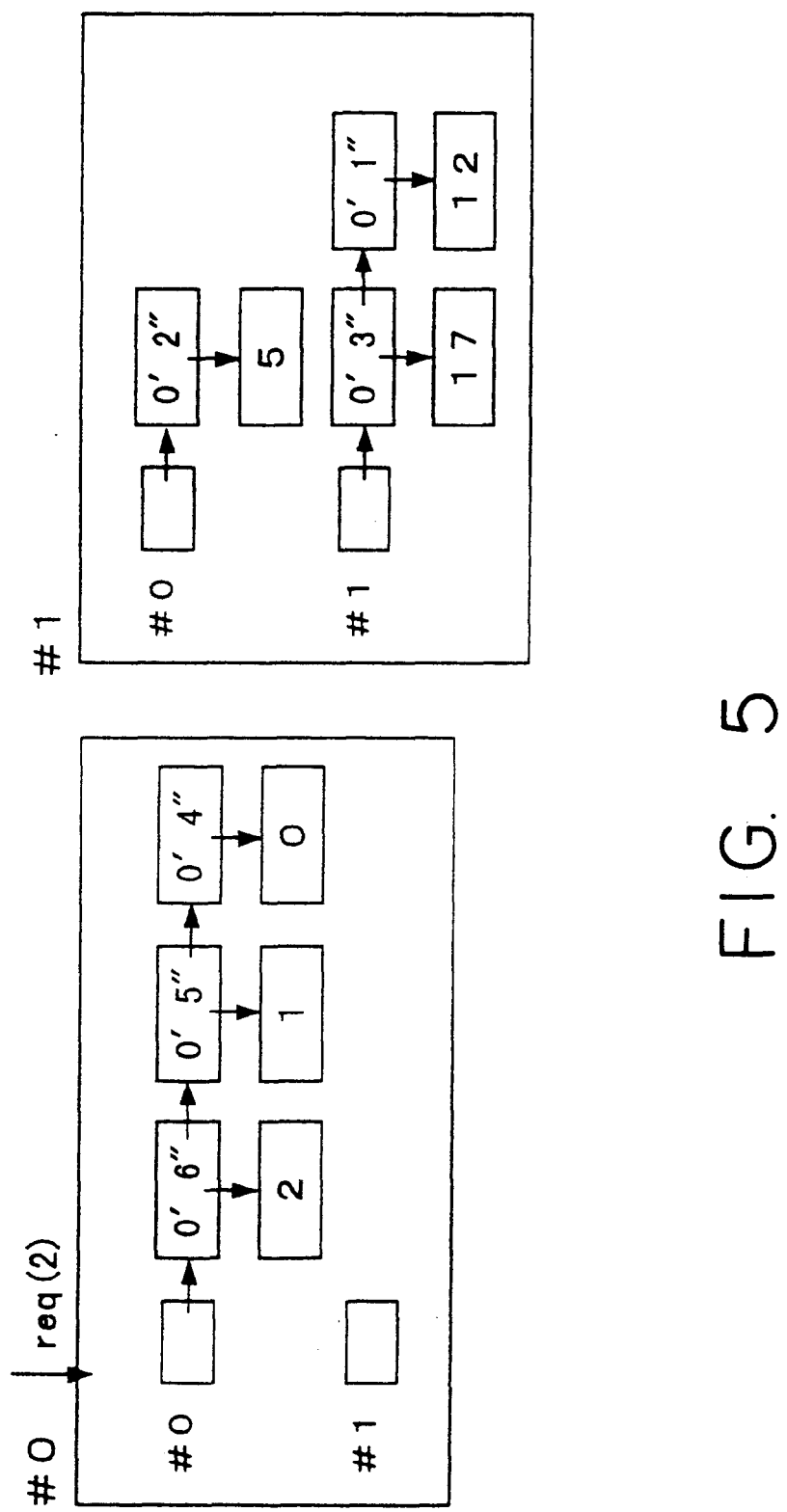
FIG. 5 shows the second state.

The third element 52 has a pointer to the data 53 of page "12", the most recent access time "0'1"" of page "12" and a pointer to a fourth element. The fourth element 54 has a pointer to the data 55 of page "10" and the most recent access time "0'0"". Then, as shown in FIG. 5, when the cache module #0 receives a request req(2) for page "2" at time 0'6", the cache module #0 reads page "2" from a storage module, and pushes out the oldest page "5".

Here, if the lower-limit of the most recent access time is calculated using the equation (1) of the transfer-out lower-limit function described above, a lower-limit "0'1"+ε" is obtained since n=2, r0 ="0'2"" and r1="0'0"". If E is assumed to be a sufficiently small value compared with 1 , it is judged that page "5" should not be discarded and transferred out since the most recent access time "0'2"" of page "5" is newer than this lower-limit. Then, page "5" is transferred out to the cache module #1 having page "10" older than page "5".

The cache module #1 which received page "5" pushes out page "10" which has the oldest most recent access time. Since the most recent access time "0'0"" of page "10" is older than the lower-limit "0'1"+ε", page "10" is discarded.

In this way, the element of page "2" read from the storage module is added to the LRU list #0 of the cache module #0, and the most recent access time "0'6"" is written in the element. The element of page "5" transferred out from the cache module #0 is added to the LRU list #0 of the cache module #1, and the element of page "10" is deleted from the LRU list #1.

Figure 6:
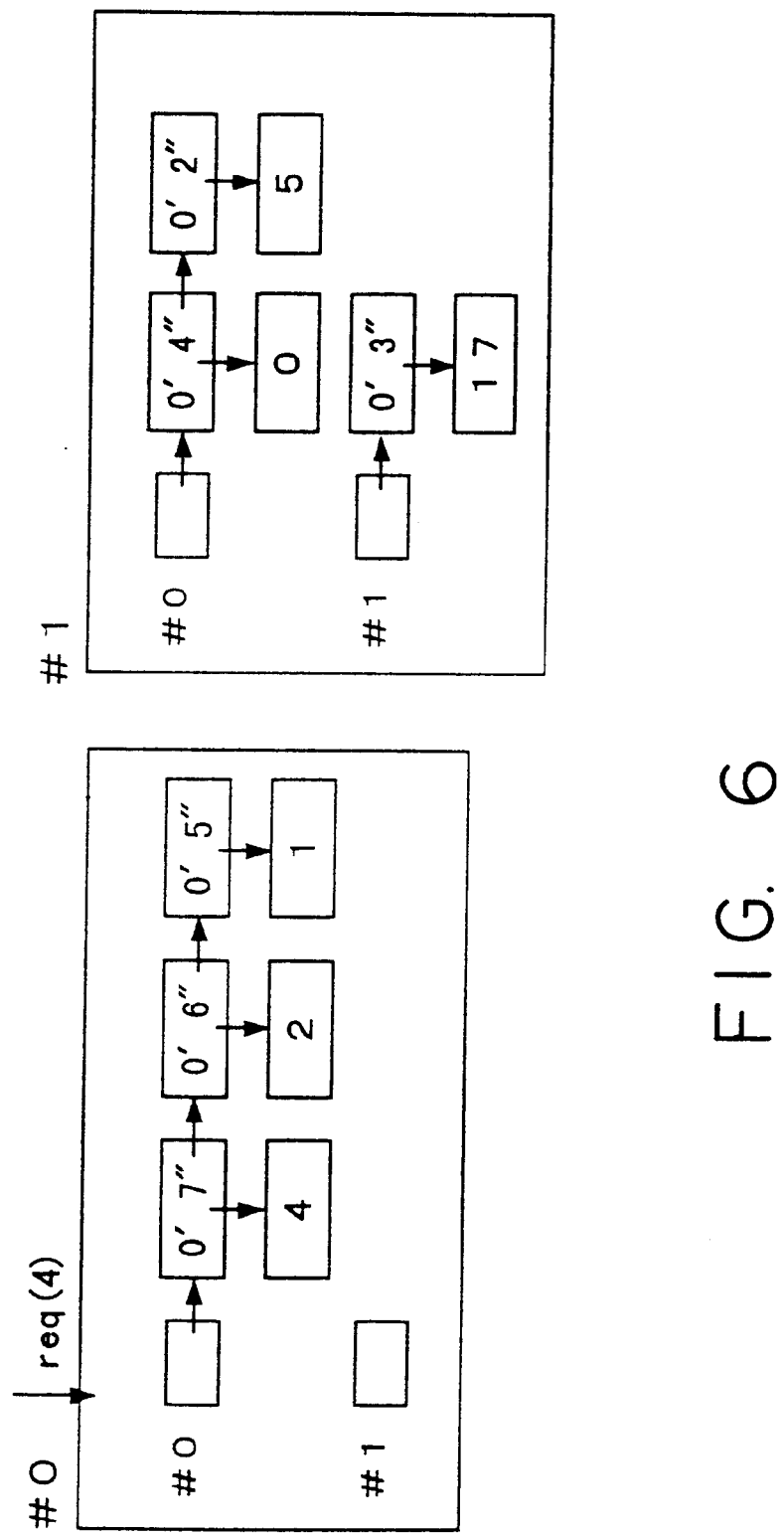
FIG. 6 shows the third state.

Then, as shown in FIG. 6, when the cache module #0 receives request req(4) for page "4" at time 0'7", the cache module #0 reads page "4" from the storage module, and pushes out the oldest page "0".

Since r0="0'4"" and r1="0'1"" here, a lower-limit "0'2.5"+ϵ" is obtained using equation (1). Since the most recent access time "0'4"" of page "0" is newer than this lower-limit, page "0" is not discarded and is transferred out to the cache module #1 with page "12" which is older than page "0".

When receiving page "0", the cache module #1 pushes out page "12" having the oldest most recent access time. Since the most recent access time "0'1"" of page "12" is older than the lower-limit "0'2.5+ϵ", page "12" is discarded.

In this way, the element of page "4" read from the storage module is added to the LRU list #0 of the cache module #0, and the most recent access time "0'7"" is written in the element. The element of page "0" transferred out from the cache module #0 is added to the LRU list #0 of the cache module #1, and the element of page "12" is deleted from the LRU list #1.

Figure 7:
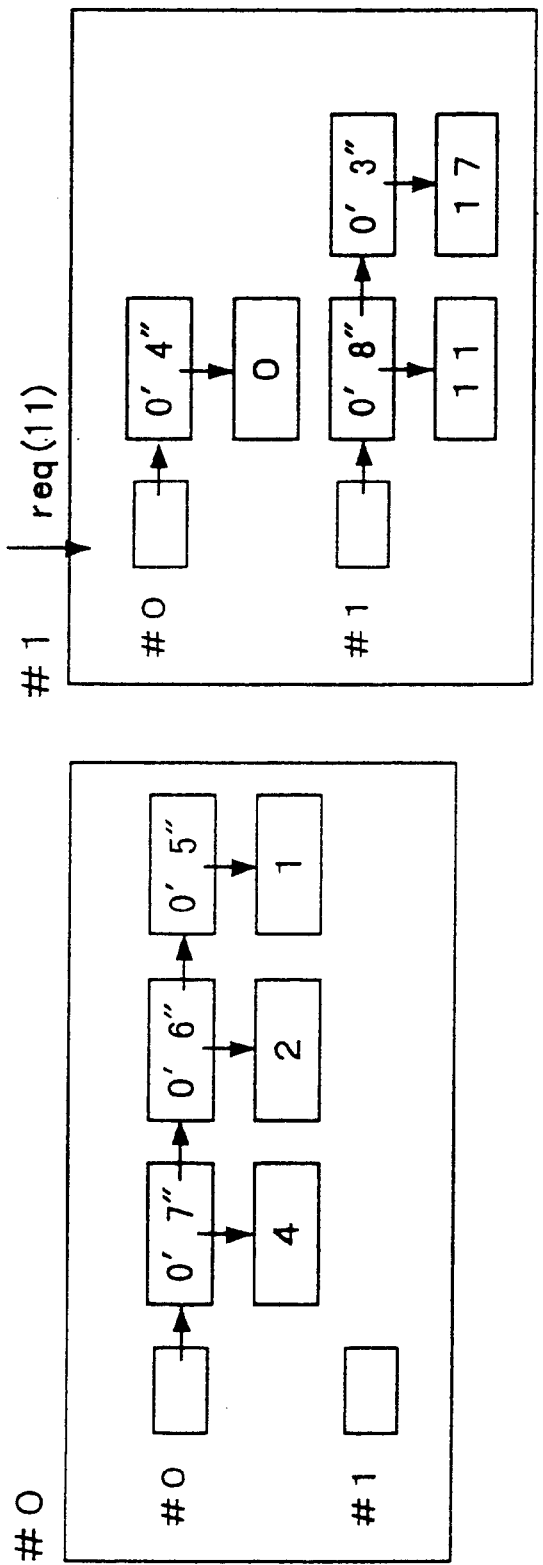
FIG. 7 shows the fourth state.

Then, as shown in FIG. 7, when the cache module #1 receives request req(11) for page "11" at time 0'8", the cache module #1 reads page "11" from the storage module, and pushes out the oldest page "5".

Since r0="0'5"" and r1="0'2"" here, a lower-limit "0'3.5"+ϵ" is obtained by using equation (1). Since the most recent access time "0'2"" of page "5" is older than the lower-limit, page "5" is discarded.

In this way, the element of page "5" is deleted from the LRU list #0 of the cache module #1, the element of page "11" read from the storage module is added to the LRU list #1, and the most recent access time "0'8"" is written in the element.

Figure 8:
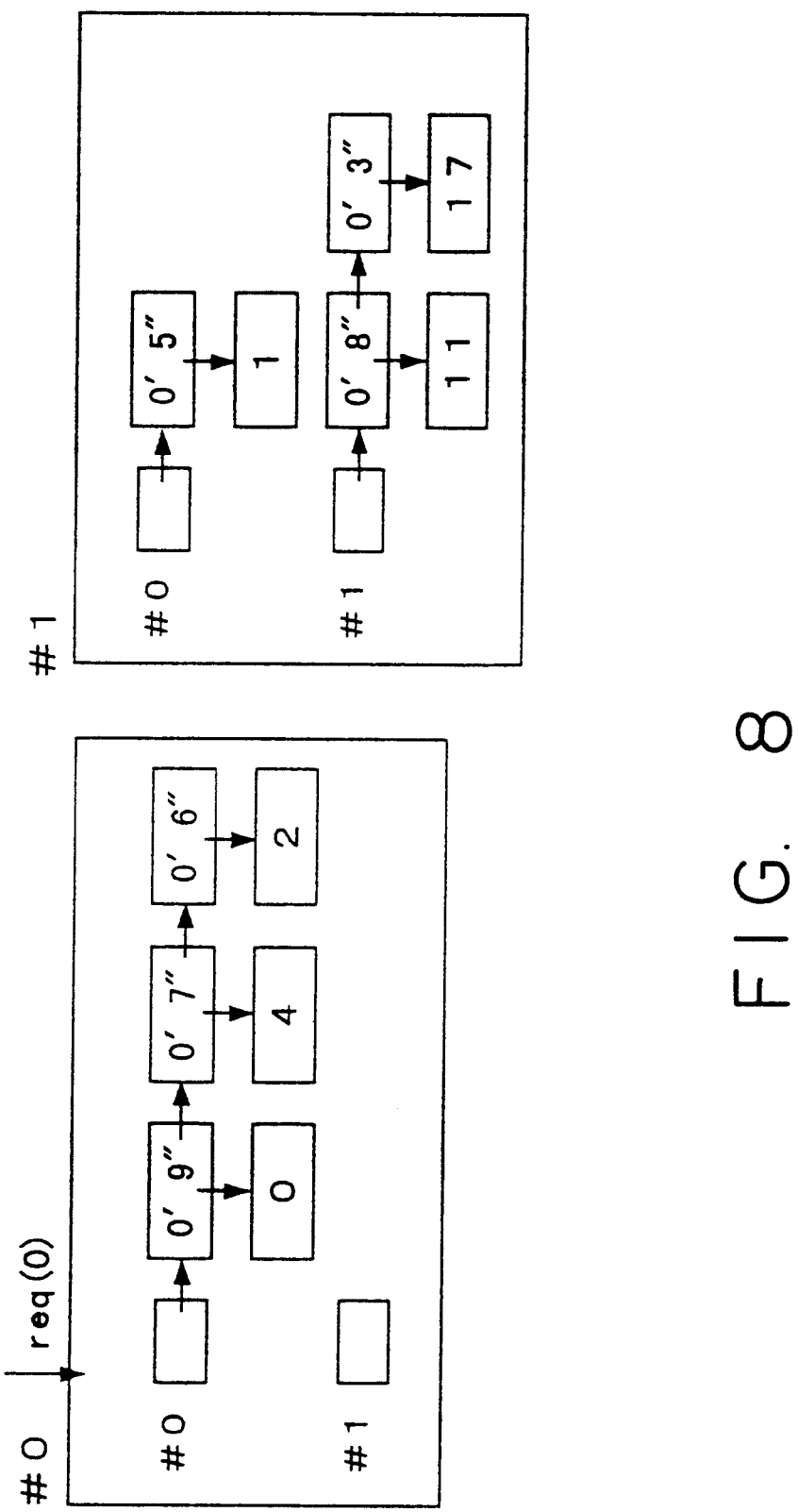
FIG. 8 shows the fifth state.

Then, as shown in FIG. 8, when the cache module #0 receives request req(0) for page "0" at time 0'9", the request hits the page since page "0" is stored in the cache module #1. Then, the cache module #0 transfers in page "0", which was transferred out to the cache module #1, and transfers out the oldest page "1" to the cache module #1.

In this way, the element of page "1" is deleted from the LRU list #0 of the cache module #0, the element of page "0" is added to the LRU list and the most recent access time "0'9"" is written in the element. The element of page "0" is deleted from the LRU list #0 of the cache module #1 and the element of page "1" is added to the LRU list.

Figure 9:
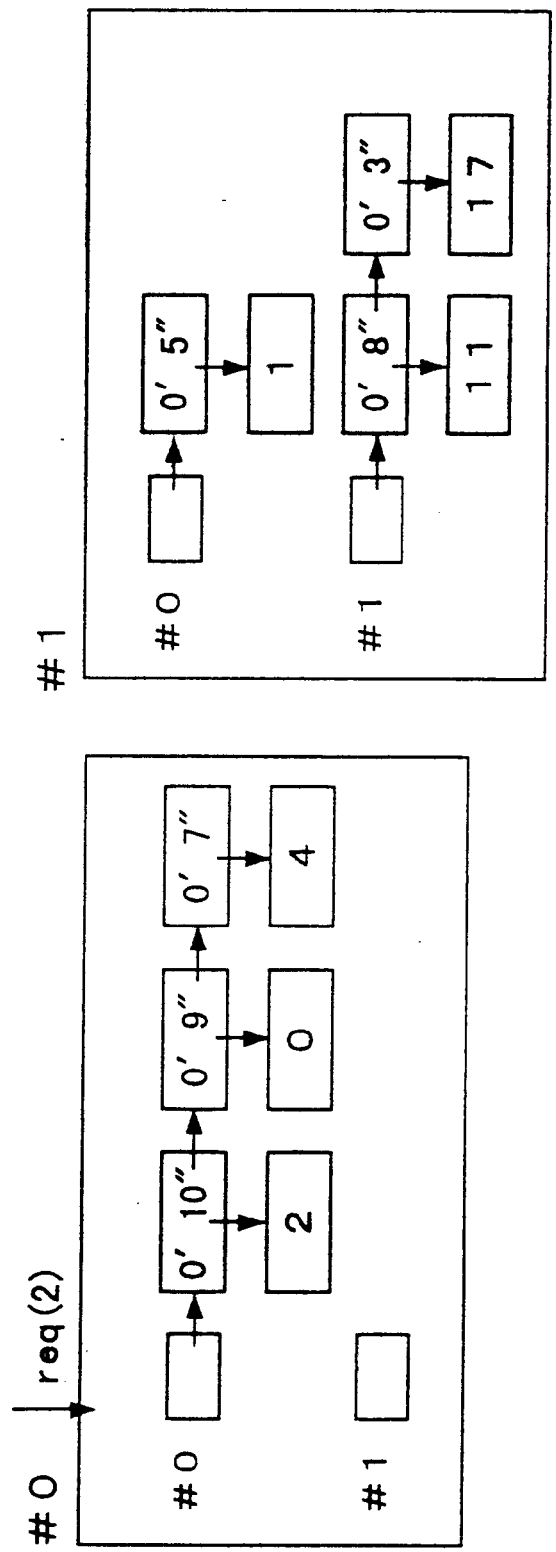
FIG. 9 shows the sixth state.

Then, as shown in FIG. 9, when the cache module #0 receives request req(2) for page "2" at time 0'10", the request is hit since page "2" is stored in the cache module #0. Then, the cache module #0 shifts the element of page "2" to the top of the LRU list #0, and writes the most recent access time "0'10"" in the element.

Figure 10:
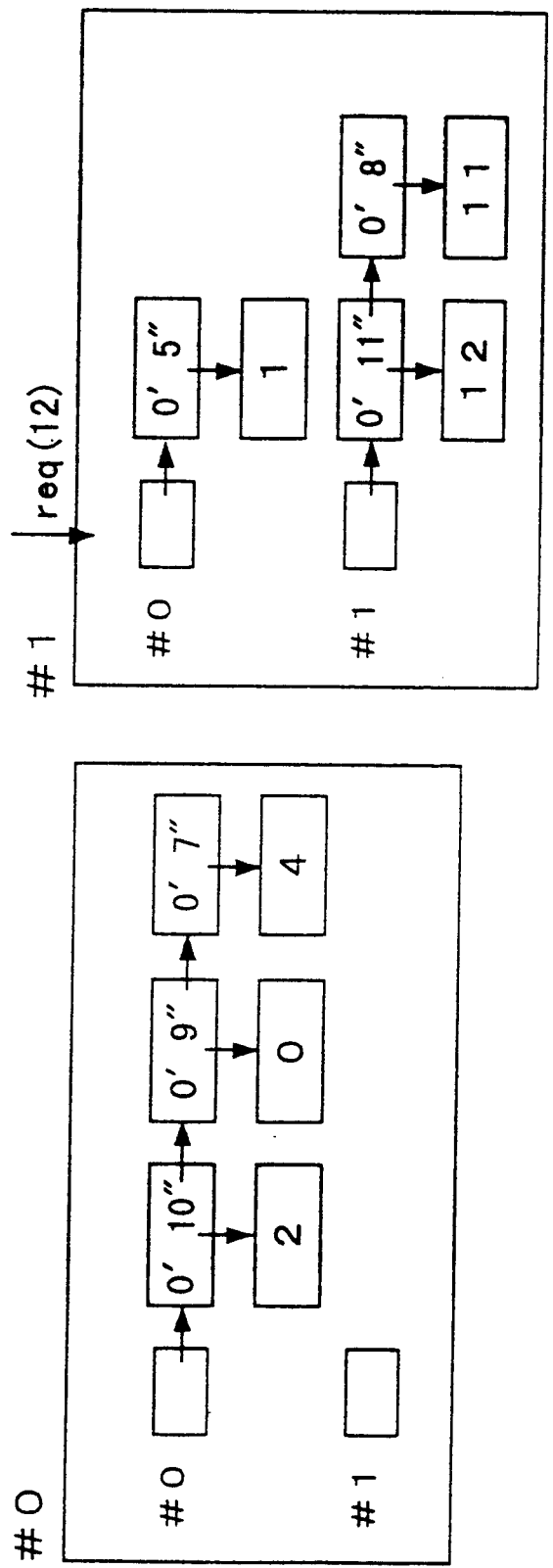
FIG. 10 shows the seventh state.

Then, as shown in FIG. 10, when the cache module #1 receives request req(12) for page "12" at time 0'11", the cache module #1 reads page "12" from the storage module, and instead pushes out the oldest page "17".

Since r0="0'7"" and r1="0'3"" here, a lower-limit "0'5"+ ϵ" is obtained by using equation (1). Since the most recent access time "0'3"" is older than the lower-limit, page "17" is discarded.

In this way, the element of page "17" is deleted from the LRU list of the cache module #1, the element of page "12" read from the storage module is added to the LRU list, and the most recent access time "0'11"" is written in the element.

Figure 11:
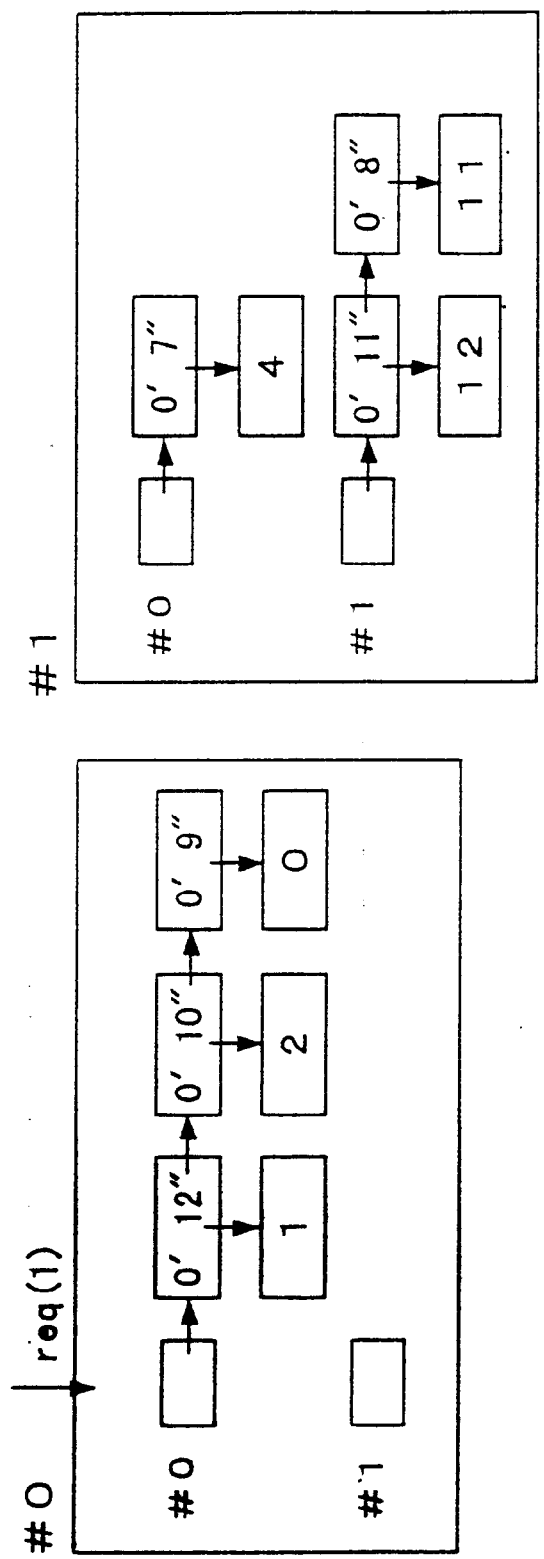
FIG. 11 shows the eighth state.

Then, as shown in FIG. 11, when the cache module #0 receives request req(1) for page "1" at time 0'12", the request is hit since page "1" is stored in the cache module #1. Then, the cache module #0 transfers in page "1", which was transferred out to the cache module #1, and transfers out the oldest page "4" to the cache module #1.

In this way, the element of page "4" is deleted from the LRU list #0 of the cache module #0, the element of page "1" is added to the LRU list, and the most recent access time "0'12"" is written in the element. The element of page "1" is deleted from the LRU list #0 of the cache module #1, and the element of page "4" is added to the LRU list.

As shown above in FIGS. 4 through 11, a page managed by a specific cache module can be stored in the other cache module by repeating the transfer-out/transfer-in of pages, and the LRU method can be employed for the entire system.

Although in the preferred embodiments described above, a case where data stored in a storage module are managed in units of pages is mainly described, the present invention is not limited to this, and it can also be applied to a case where data are managed in units of variable-length segments.

A storage module managed by a cache module does not necessarily correspond to all the data of one secondary storage device, and a part of the data can also be considered as a logical storage module.

Moreover, an algorithm for determining whether to transfer out or discard data is not limited to a transfer-out lower-limit function, such as equation (1), and an algorithm based on another attribute, such as type and size of data, etc., can also be used.

According to the present invention, optimum data allocation for an entire system can be performed by dynamically performing the transfer-out/transfer-in of data between a plurality of cache modules, and the hit rate of caches can be improved. Since a group of data belonging to one storage system are managed by one cache module, exclusive control and consistency maintaining control can be efficiently performed.

What is claimed is:

1. A cache controlling apparatus for controlling a cache operation of a storage system which is composed of a plurality of cache modules connected to each other, and storage modules each of which are connected to each of the cache modules and store information, comprising:

a managing unit storing management data for uniformly managing information which belongs to a storage module connected to a first cache module of the plurality of the cache modules, the managed information being distributed to and stored in the first cache module and a second cache module of the plurality of the cache modules based upon access times for each part of the managed information, the management data including data for managing a part of the managed information stored in the first cache module and data for managing a part of the managed information stored in the second cache module, and causing the first cache module to check a location of a part of the managed information by using the management data;

a transferring-out unit transferring out a target part of the managed information from the first cache module to the second cache module; and a transferring-in unit transferring the target part of the managed information from the second cache module into the first cache module when the target part of the managed information is found to be in the second cache module according to the management data.

2. The cache controlling apparatus according to claim 1, wherein when the first cache module receives an access request for the target part of the managed information stored in the second cache module, said transferring-in unit transfers the target part of the managed information into the first cache module.

3. The cache controlling apparatus according to claim 1, further comprising:
a judging unit judging whether the target part of the managed information is to remain in, be discarded or be transferred out of the first cache module; and
a transfer-out destination determining unit, when the target part of the managed information has been judged to be transferred out, determining a cache module to which the target part of the managed information is transferred.

4. The cache controlling apparatus according to claim 3, wherein when an empty area is secured to store a piece of information by the first cache module, if the target part of the managed information has been judged to be transferred out by said judging unit, said transferring-out unit secures the empty area by transferring out the target part of the managed information judged to be transferred out.

5. The cache controlling apparatus according to claim 3, wherein when an empty area is secured to store a piece of information by the first cache module, if the target part of the managed information has been judged to be discarded by said judging unit, the first cache module secures the empty area by discarding the target part of the managed information judged to be discarded.

6. A cache controlling apparatus for controlling a cache operation of a storage system which is composed of a plurality of cache modules connected to each other, and storage modules each of which are connected to each of the cache modules and store information, comprising:
a managing unit allowing information managed by a first cache module of the plurality of the cache modules to be distributed to and stored in the first cache module and a second cache module;
a transferring-out unit transferring out a part of the information managed by the first cache module from the first cache module to the second cache module;
a transferring-in unit transferring the part of the information from the second cache module into the first cache module;
a judging unit judging whether the part of the information managed by the first cache module is to remain in, be discarded or be transferred out of the first cache module; and
a transfer-out destination determining unit, when the part of the information has been judged to be transferred out, determining a cache module to which the part of the information is transferred,
wherein when an empty area is secured to store a piece of information by the first cache module, if the part of information has been judged to be discarded by said judging unit, the first cache module secures the empty area by discarding the part of the information judged to be discarded, and
wherein when there is no information judged to be transferred out by said judging unit, the first cache module discards the part of the information judged to be discarded.

7. The cache controlling apparatus according to claim 3, wherein said judging unit judges whether the target part of the managed information is to be transferred out, based on a most recent access time of the managed information.

8. A cache controlling apparatus for controlling a cache operation of a storage system which is composed of a plurality of cache modules connected to each other, and storage modules each of which are connected to each of the cache modules and store information, comprising:
a managing unit allowing information managed by a first cache module of the plurality of the cache modules to be distributed to and stored in the first cache module and a second cache module;
a transferring-out unit transferring out a part of the information managed by the first cache module from the first cache module to the second cache module;
a transferring-in unit transferring the part of the information from the second cache module into the first cache module;
a judging unit judging whether the part of the information managed by the first cache module is to remain in, be discarded or be transferred out of the first cache module; and
a transfer-out destination determining unit, when the part of the information has been judged to be transferred out, determining a cache module to which the part of the information is transferred,
wherein said judging unit judges whether the part of the information managed by the first cache module is to be transferred out, based on a most recent access time of the information managed by the first cache module, and
wherein said judging unit calculates a specific time from the oldest time of most recent access times in each cache module using a function, and judges that information with a most recent access time, which is newer than the specific time, is to be transferred out.

9. The cache controlling apparatus according to claim 8, wherein said judging unit uses an average of the oldest times of the most recent access times in cache modules as the function.

10. A cache controlling apparatus, comprising:
a unit storing management data for uniformly managing information which belongs to a storage module connected to a first cache module, the managed information being distributed to and stored in the first cache module and a second cache module based upon access times for each part of the managed information, the management data including data for managing a part of the managed information stored in the first cache module and data for managing a part of the managed information stored in the second cache module, causing the first cache module to check a location of a part of the managed information by using the management data and dynamically shifting the managed information between the first cache module and the second cache module; and
a unit receiving an access request for the information shifted to the second cache module via the first cache module.

11. A cache controlling apparatus for controlling a cache operation of a storage system, which is composed of a plurality of cache modules connected to each other through a network and having a processor and a memory, and storage modules each of which are connected to each of the cache modules and store information, comprising:
a managing unit storing management data for uniformly managing information which belongs to a storage module connected to a first cache module of the plurality of the cache modules, the managed information being distributed to and stored in the first cache module and a second cache module of the plurality of the cache modules based upon access times for each part of the managed information, the management data including data for managing a part of the managed information stored in the first cache module and data for managing a part of the managed information stored in the second cache module, and causing the first cache module to check a location of a part of the managed information by using the management data;

a transferring-out unit transferring out a target part of the managed information and stored in a memory of the first cache module from the memory of the first cache module to a memory of the second cache module;

a transferring-in unit transferring the target part of the managed information and stored in the memory of the second cache module from the memory of the second cache module into the memory of the first cache module when the target part of the managed information is found to be in the second cache module according to the management data;

a judging unit judging whether arbitrary information in the memory of the first cache module is to remain in, be discarded or be transferred out of the memory of the first cache module; and a transfer-out destination determining unit, when the arbitrary information is to be transferred out, determining a cache module to which the information is transferred.

12. A computer-readable storage medium on which is recorded a program for causing a computer to control a cache operation of a storage system which is composed of a plurality of cache modules connected to each other and storage modules each of which are connected to each of the cache modules and store information, said program causing the computer to perform:

storing management data for uniformly managing information which belongs to a storage module connected to a first cache module of the plurality of the cache modules, the managed information being distributed to and stored in the first cache module and a second cache module of the plurality of the cache modules based upon access times for each part of the managed information, the management data including data for managing a part of the managed information stored in the first cache module and data for managing a part of the managed information stored in the second cache module;

transferring out a target part of the managed information from the first cache module to the second cache module;

causing the first cache module to check a location of the managed information by using the management data; and transferring the target part of the managed information from the second cache module to the first cache module, when the first cache module receives an access request for the target part of the managed information and the target part of the managed information is found to be in the second cache module according to the management data.

13. A cache controlling method for controlling a cache operation of a storage system which is composed of a plurality of cache modules connected to each other and storage modules each of which are connected to each of the cache modules and store information, comprising:

storing management data for uniformly managing information which belongs to a storage module connected to a first cache module of the plurality of the cache modules, the managed information being distributed to and stored in the first cache module and a second cache module of the plurality of the cache modules based upon access times for each part of the managed information, the management data including data for managing a part of the managed information stored in the first cache module and data for managing a part of the managed information stored in the second cache module;

transferring out a target part of the managed information from the first cache module to the second cache module;

transmitting an access request to the first cache module;

causing the first cache module to check a location of the managed information by using the management data; and transferring the target part of the managed information from the second cache module to the first cache module, when the access request is an access request for the target part of the managed information and the target part of the managed information is found to be in the second cache module according to the management data.

* * * * *